(Model.)

S. J. WISDOM.
NUT LOCK.

No. 326,700.  Patented Sept. 22, 1885.

WITNESSES:
Chas. Lurcott
C. Sedgwick

INVENTOR:
S. J. Wisdom
BY Munn & Co.
ATTORNEYS.

UNITED STATES PATENT OFFICE.

SAMUEL J. WISDOM, OF MONTGOMERY, ALABAMA.

NUT-LOCK.

SPECIFICATION forming part of Letters Patent No. 326,700, dated September 22, 1885.

Application filed June 26, 1884. (Model.)

*To all whom it may concern:*

Be it known that I, SAMUEL J. WISDOM, of Montgomery, in the county of Montgomery and State of Alabama, have invented certain new and useful Improvements in Locking-Washers for Nuts, of which the following is a full, clear, and exact description.

My improved locking-washer is designed especially for use with the flanged fish-plates now commonly used.

Besides furnishing a cheap and reliable lock for nuts, the object of the invention is to provide a washer that can be applied to the bolt without taking off the nut, that being often a work of some difficulty on account of the burrs on the bolt.

To these ends the invention consists in a washer having an inclined slot, and made with its top edge slightly bent, as hereinafter described and claimed.

Reference is to be had to the accompanying drawings, forming a part of this specification, in which similar letters of reference indicate corresponding parts in all the figures.

Figure 1:
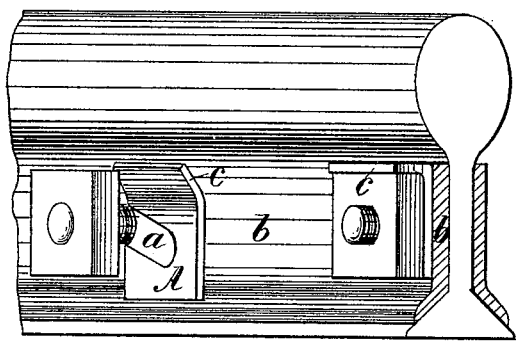
Figure 2:
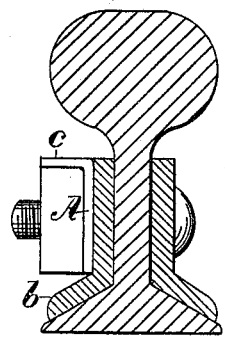
Figure 3:
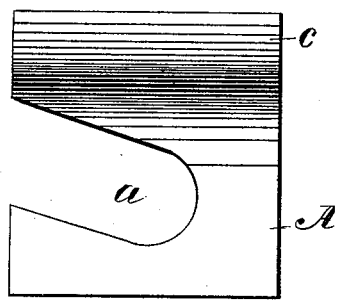
Figure 4:

Figure 1 is a side perspective view of a rail end and fish plate, with the locking-washer applied to the bolts. Fig. 2 is a cross-section of the same. Fig. 3 is a face view, and Fig. 4 an edge view, of the washer.

The washer A is formed from sheet metal, and with an aperture, *a*, for the bolt, which aperture is a slot extending from the center to one side and inclining in an upward direction. The upper edge, *c*, is bent slightly outward, so that when the washer is in place the bent edge clears the head of the rail, and can be readily bent down on the nut by a hammer.

When used with a flanged fish-plate, *b*, as shown, the width from the bottom of slot *a* to the lower edge of the washer should be such as to allow the edge to take upon the flange of the plate, or nearly so, and when a flanged fish-plate is not used the edge should take on the flange of the rail.

To apply the washer the nut is moved slightly out on the bolt, and the washer put on by sliding it in at one side, as illustrated in Fig. 1. The incline of the slot *a* corresponds to the incline of the fish-plate flange, so that the washer readily slips upward and backward to place. When the nut is screwed down, the washer cannot slip sidewise on account of its resting on the flange, and the bending down of its upper edge holds it still more securely and locks the nut.

Having thus fully described my invention, I claim as new, and desire to secure by Letters Patent—

1. The locking-washer consisting of the flat plate A, formed with a slot, *a*, extended upward and outward to one vertical edge thereof, the top edge of said washer being bent outward, as described.

2. The combination, with the flanged fish-plate and its fastening bolt and nut, of the flat locking-washer A, having the upward and outward inclined slot *a* in one vertical edge, and the outward-bent top edge, *c*, as shown, whereby when the washer is forced into place the upper edge of the slot bearing on the bolt will cause the said washer to rise until the bend at the top thereof is approximately even with the top of the nut, substantially as set forth.

SAMUEL J. WISDOM.

Witnesses:
G. D. NOBLE,
J. H. LAKIN.